May 7, 1968

A. R. CRIPE 3,382,017

RESILIENTLY MOUNTED AXLE BEARING ASSEMBLY

Filed Dec. 28, 1965

INVENTOR
ALAN R. CRIPE

BY Richard N. James
ATTORNEY

_United States Patent Office_

3,382,017
Patented May 7, 1968

3,382,017
RESILIENTLY MOUNTED AXLE BEARING ASSEMBLY
Alan R. Cripe, Richmond, Va., assignor to United Aircraft Corporation, East Hartford, Conn., a corporation of Delaware
Filed Dec. 28, 1965, Ser. No. 516,898
4 Claims. (Cl. 308—238)

This invention relates to resiliently mounted axle bearing assemblies, particularly as applied to high performance railway equipment.

In the construction of modern lightweight railway equipment it has become increasingly important to isolate the vehicle's occupants from the effects of noise and high frequency vibrations generated external to the vehicle interior. Every effort is made to provide such isolation through the use of resilient members between the running gear and the vehicle framework to minimize the transmission of troublesome noise and vibration therebetween. The resilient members also promote improved wheel-rail contact with increased adhesion for trains incorporating high rates of acceleration and deceleration. The greater wheel-rail contact further enhances passenger safety by limiting the lift of the wheel off the rail, which has been estimated to be as much as a quarter of an inch at high speed.

It has previously been proposed to position the axle bearings in a resilient mounting in the supporting structure. By eliminating any direct metal-to-metal contact between the rotating axles and the supporting framework, high frequency vibrations are effectively eliminated from the interior of the vehicle. Typically such resilient bearing assemblies comprise a supporting structure enclosing a captive rubber bushing which in turn supports a roller bearing at the external surface of the outer race. Accordingly, the entire bearing is free to float radially within the limits established by the resilience of the rubber bushing. High frequency vibrations generated by the passage of the metal wheel over the steel rail are contained within the mounting itself by absorption within the rubber mounting. The efficiency of the vibrational and acoustical suppression in the assembly is primarily a function of the resilience of the rubber which in turn is determined by its composition and thickness. Other advantages are also to be found in resilient axle box mountings. No loosely-fitting parts are incorporated to promite noise and increased wear.

It has been found, however, that freedom of movement of the bearing within the mounting must be severely restricted, thereby defeating to a considerable extent the effectiveness of the resilient mounting as a vibration barrier. Railway units provided with an axle and bearing mounting of this design have exhibited excessive and erratic wheel wear, the progressive effects of which have defeated the very purpose for which the resilient mountings were provided in the first instance. Further, undamped resilient mountings actually adversely effect wheel-rail contact through the establishment of resonant vibration within the resilient mountings themselves. It has therefore become very evident that the "float" of the bearings assembled according to this design must be held within very narrow limits.

While the exact reason for the previously mentioned excessive and erratic wheel wear is unknown, it is postulated that a slight wheel unbalance or wheel oscillation generated by irregularities in the rail at certain critical speeds are amplified in the resilient mounting. The natural frequency of the rubber itself is felt to add to the vibrational movement of the wheels, creating excessive bearing chatter within the rubber bushing, eventually leading to localized wheel wear and the ultimate necessity of wheel replacement.

It is a fundnamental object of the present invention to provide a resiliently mounted axle bearing assembly for lightweight railway equipment which exhibits internal damping whereby oscillations produced by the rubber mounting itself are reduced. This objective is accomplished by providing a rubber bushing formed of a plurality of arcuate segments which provide varying resilience and damping at diametrically opposed areas of the bushing.

Another object of this invention is generally to improve the performance and endurance of resiliently mounted axle bearing assemblies.

These and other objects and advantages of this invention will be set forth in the following description or will be evident therefrom or from practice of this invention which can best be described by reference to the following drawings of which:

Figure 1:
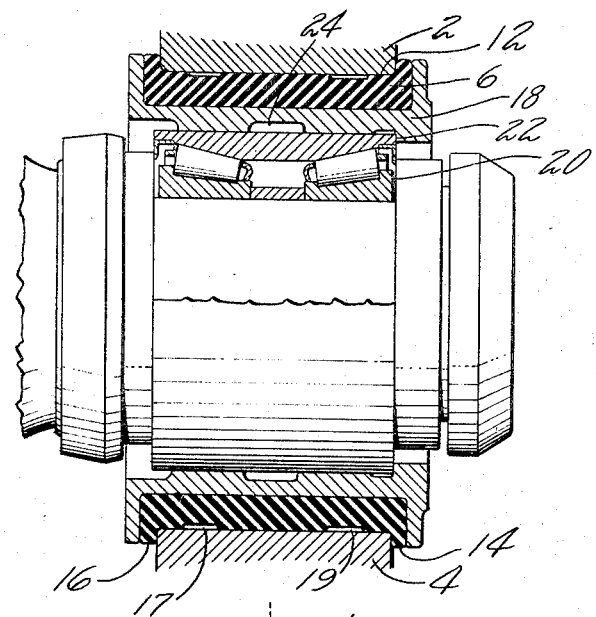
FIG. 1 is a view in elevation of one embodiment of the resilient bearing assembly, shown partially in cross section.
Figure 2:
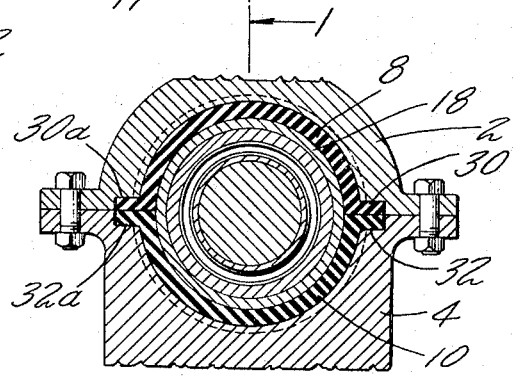
FIG. 2 is a cross-sectional view of the bearing assembly of FIG. 1 taken along the line 2—2, illustrating particularly the split housing and split resilient bushing.

As is clearly seen in FIGS. 1 and 2, this invention comprises a split bearing housing including upper and lower housing sections 2 and 4, respectively. A resilient bushing 6, which preferably includes an upper segment 8 and a lower segment 1, is closely fitted in the circular opening provided in the bearing housing and is circumferentially supported thereby. The bushing is formed with a trough 12 in its outer surface into which mating surfaces of the respective housing sections are positioned, the sections completely filling the trough formed in the bushing. The upstanding sides 14 and 16 of the bushing abut the edges of the respective housing sections to maintain the bushing in a fixed axial position with respect to the housing. The circumferential relieved portions 17 and 19 provided in the outer surface of the resilient bushing provide void space into which the bushing flows during deformation.

A metal bearing-retention member or liner 18 is provided around the internal periphery of the resilient bushing, providing internal support to the bushing and a firm seat in which a bearing 20 is retained. A channel provided in the outer surface of the liner 18 conforms closely to the shape and size of the contained bushing and the bushing is held captive between the liner and the opposing housing sections. It will be seen that within the limits established by the resilience of the bushing in an axial direction the liner is relatively immovable in the assembly in such direction.

An internal annular shoulder 22 is provided in the interior surface of the liner 18 to form a seat against which the bearing 20 is axially positioned. Although it is not shown in the drawings, the liner may optionally be provided with an internal passageway through which lubrication may be furnished to the bearing. With this modification incorporated in the structure, the lubricating material would be fed to a peripheral channel 24 formed in the inner surface of the liner and then to the bearing through a conduit (not shown) drilled through the outer race of the bearing. Normally the liner will be closely fitted onto the bearing and accordingly the liner will be of sufficient thickness to provide the requisite circumferential support for the bearing to maintain the fit, and thus hold the bearing in a fixed position with respect to the liner.

It will be seen that the bearing is free to float within the housing to the extent provided by the resilience of the rubber bushing. Further, slight shaft misalignments will be accommodated by appropriate deformation of the resilient bushing. However, as hereinbefore indicated, experience has demonstrated the necessity for severely limiting the bearing float within such a device unless a provision is made for inherent damping within the resilient bushing itself.

To provide the desired damping, the bushing is formed into a plurality of arcuate segments to provide varying resilience at diametrically opposed areas of the bushing. In the construction shown most clearly in FIG. 2, the bushing is formed into two segments 8 and 10 which are held against circumferential rotation by flange portions 30, 30a, 32 and 32a which engage in a cooperating recess provided in the housing. One of these segments is formed of a material having different vibration damping characteristics than those of the other section whereby any oscillations set up by the resilience of one segment is opposed by the different natural frequency or absolute damping effect imposed by the other section. Preferably, one of the segments will be formed of butyl rubber which is known to exhibit excellent vibration damping qualities.

Figure 3:
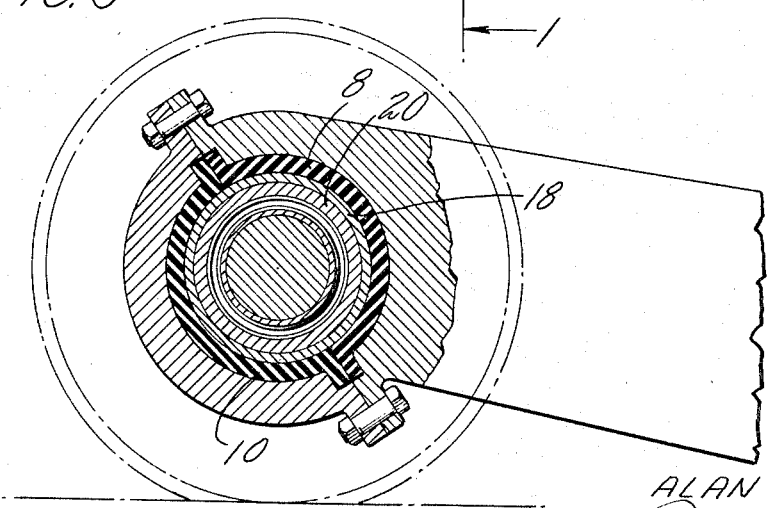
FIG. 3 is a view similar to FIG. 2 illustrating a second embodiment of this invention, the housing in this case being split at an angle with respect to the horizontal.

Since the normal vibrational forces generated at the bearing will include both a vertical component resulting from wheel unbalance and track irregularities, and a horizontal component resulting from varying wheel drag, it may be preferable to orient the axis of the division between the bushing segments at an angle with respect to the horizontal. Such an orientation is shown in FIG. 3. Although in the drawings the direction of the split in the housing has been shown to coincide with that of the split in the bushing, this is, of course, not necessary, although it will normally be the most convenient construction. Further, although the bushing has been illustrated and described to show the bushing formed in semi-circular segments, it may be advisable in a given installation to form the segments in a different configuration; or to provide a different number of segments or segments of different thicknesses.

It is evident that by this invention there has been provided a resiliently-mounted bearing wherein oscillations developed within the resilient bushing are effectively absorbed and damped. Further, the device is readily fabricated and assembled, and, by the simple substitution of segments of the resilient bushing, different characteristics of resilience and damping may be incorporated in the assembly without substantially altering the design of the other components.

While the present invention has been illustrated and described in connection with several preferred embodiments, no limitation is intended thereby except as set forth in the following claims.

What is claimed is:

1. A resiliently mounted axle bearing assembly comprising:
    a split housing, including upper and lower housing sections defining a circular opening parallel to the axis of the assembly,
    a metal bearing-retention member having a channel formed in its outer surface,
    a resilient bushing held captive in the channel of the metal member and sandwiched in the circular opening between the metal member and the housing, the bushing having a trough formed in its outer surface into which cooperating surfaces on the respective housing sections are closely-fitted, the bushing being split into upper and lower arcuate segments of different materials to provide different vibration-damping characteristics at diametrically opposed areas of the bushing, and
    a bearing fixedly positioned within the metal member with its axis coinciding with that of the opening in the metal member.

2. The axle bearing assembly of claim 1 in which one of the segments of the resilient bushing is fabricated of butyl rubber.

3. A resiliently mounted axle bearing assembly comprising:
    a split bearing housing, including upper and lower housing sections defining an opening parallel to the axis of the assembly,
    a captive annular resilient bushing positioned within the opening and circumferentially and axially supported by the housing, the bushing being formed of a plurality of arcuate segments of materials having a different modulus of resilience at diametrically-opposed areas of the bushing to provide inherent oscillation damping,
    a rigid bearing-retention member disposed radially within the bushing and circumferentially and axially supported thereby, the outer diameter of the member exceeding that of the opening in the housing whereby the member is held immovable in an axial direction within the housing within the limits established by the resilience of the bushing,
    and a bearing fixedly positioned within the rigid member.

4. A resiliently mounted axle bearing assembly comprising:
    a split bearing housing, including upper and lower housing sections defining an opening parallel to the axis of the assembly,
    a rigid bearing-retention member held captive circumferentially and axially in the housing opening,
    an annular resilient bushing of channel cross-section circumferentially supporting the rigid member in the opening and sandwiched between the rigid member and the housing, the sides of the bushing comprising radially-directed flange portions disposed between the axially confronting surfaces of the rigid member and the housing to limit the axial movement of the rigid member within the opening, the bushing being formed of a plurality of arcuate segments of materials having a different modulus of resilience to provide different vibration damping characteristics at diametrically-opposed areas of the bushing,
    and a bearing fixedly positioned within the rigid member and circumferentially supported thereby.

References Cited
UNITED STATES PATENTS

| | | | |
|---|---|---|---|
| 3,309,153 | 3/1967 | Kelley et al. | 308—26 X |
| 2,061,767 | 11/1936 | Hobson | 105—197 |
| 2,976,819 | 3/1961 | Rossell | 105—138 |
| 3,110,526 | 11/1963 | Sternlight | 308—26 |
| 3,236,570 | 2/1966 | Satterthwaite | 308—74 |

MARTIN P. SCHWADRON, *Primary Examiner.*

DAVID J. WILLIAMOWSKY, *Examiner.*

N. ABRAMS, G. N. BAUM, *Assistant Examiners.*